United States Patent [19]

Pinel

[11] 3,848,098

[45] Nov. 12, 1974

[54] TELEPHONE HYBRID TRANSFORMER BALANCE NETWORK

[75] Inventor: John Fowler Pinel, Kanata, Ontario, Canada

[73] Assignee: Bell-Northern Research Ltd., Ottawa, Ontario, Canada

[22] Filed: Dec. 13, 1973

[21] Appl. No.: 424,277

[52] U.S. Cl. .......... 179/170 D
[51] Int. Cl. .......... H04b 1/52
[58] Field of Search ....... 179/170 R, 170 D; 333/11, 333/77

[56] References Cited

UNITED STATES PATENTS

| | | | |
|---|---|---|---|
| 2,478,395 | 8/1949 | Herrick | 333/11 |
| 2,909,733 | 10/1959 | Walter | 179/170 D |
| 3,178,521 | 4/1965 | Brown | 179/170 D |

FOREIGN PATENTS OR APPLICATIONS

| | | | |
|---|---|---|---|
| 248,649 | 7/1944 | Switzerland | 179/170 D |

*Primary Examiner*—Kathleen H. Claffy
*Assistant Examiner*—Randall P. Myers
*Attorney, Agent, or Firm*—John E. Mowle

[57] ABSTRACT

An improved balance network for a two-wire to four-wire hybrid transformer having its two-wire port connected to an inductively loaded telephone line. The balance network includes a resistively damped series resonant circuit which coacts with the balance of the components in the network to provide an improved impedance match with the telephone line at low audio frequencies.

4 Claims, 4 Drawing Figures

TELEPHONE HYBRID TRANSFORMER BALANCE NETWORK

BACKGROUND OF THE INVENTION

This invention relates to a balance network for a telephone two-wire to four-wire hybrid transformer and more particularly to one which provides improved matching and consequently greater trans-hybrid loss when connected to an inductively loaded telephone line or cable.

A typical voice-frequency telephone transmission system utilizes a multi-pair cable which employs inductive loading coils located at periodic intervals to reduce the attenuation of the cable pairs. Long line systems such as are encountered in inter-office trunks often require line repeaters to compensate for the transmission loss along the cable. In the past, both two-wire negative-impedance repeaters and two-wire to four-wire hybrid repeaters have been utilized.

In the hybrid repeater, the incoming two-wire telephone line from each direction is split into a four-wire configuration forming two pairs, each of which contains a repeater amplifier for amplifying the signals in one of the two directions. These two amplifiers together with the hybrid transformers form a closed loop which may oscillate or "sing" if the gain of the amplifiers less the trans-hybrid losses at any frequency across the band is greater than unity. It is well known that the trans-hybrid loss (i.e. the signal loss between the four-wire ports of the hybrid transformer when the two-wire ports are terminated) is a function of the impedance match between the balance network and the two-wire telephone line connected to the two-wire ports of the hybrid transformer. The impedance of the telephone line can however vary widely depending upon the overall length and gauge of the line, the inductance of the loading coils, the length and gauge of cable out to the first loading coil and the far end termination which may be another repeater amplifier, a central office impedance or a telephone set. Consequently, it is necessary to compromise between these various types of impedance conditions to achieve the best overall match under various operating parameters.

In North American telephone systems, a standard load for a two-wire telephone line is approximately 900 ohms resistance in series with 2.16 $\mu$F capacitance. When terminated in this load, an inductively loaded telephone line generally presents an 1100 ohm (approximately) resistive component at mid-band audio frequencies which increases below about 400 Hz. The reactive component on the other hand is somewhat less constant and tends to deviate widely below about 600 Hz depending upon the length and gauge of cable, the type of inductive loading, the length and gauge of cable out to the first loading coil and the far end termination.

When a particular telephone line terminates in a telephone set, both its resistive and reactive components are generally similar to the standard load, except below about 600 Hz where with some configurations, it causes a relative increase in negative reactance, while in others a relative decrease. As a result, this has introduced a marked mismatch at low audio frequencies between the telephone line and existing balance networks used in hybrid repeaters, which has resulted in the telephone operating companies having to use less than the desired "singing" safety margin or to lower the gain of the amplifiers in the repeaters in order to prevent the above-described singing condition. This latter course of action results in a somewhat unsatisfactory decrease in the signal level received at the telephone sets which requires the parties to talk louder in order to be adequately heard.

SUMMARY OF THE INVENTION

It has been found that by introducing a series resonant circuit in one form of a balance network, that a much closer reactance match can be obtained between the network and the inductively loaded telephone line particularly at the low end of the audio spectrum, thereby improving the trans-hybrid loss and consequently the singing margin of the repeater amplifier.

Thus, in accordance with the present invention there is provided an improved network, for a telephone two-wire to four-wire hybrid transformer which is connected to an inductively loaded telephone line. The network comprises a series connected combination of a shunt connected resistive-capacitive low audio frequency shaping network, a line approximating resistance and a shunt resonant inductive-capacitive high audio frequency shaping network. Connected across this series connected combination is a build-out capacitance. The improvement in the balance network comprises a series connected combination of a resistor and series resonant inductive-capacitive low audio frequency compensating network connected in shunt with the series combination of the line approximating resistance and the high audio frequency shaping network. This series resonant network coacts with the balance of the network components primarily below its series resonant frequency to provide a more satisfactory impedance match with the inductively loaded two-wire telephone line. In addition, this damped resonant circuit also provides some damping of the shunt resonant network at high audio frequencies which reduces the overall sensitivity to impedance changes under varying ambient conditions.

BRIEF DESCRIPTION OF THE DRAWINGS

An example embodiment of the invention will now be described with reference to the accompanying drawings in which.

DESCRIPTION OF THE PREFERRED EMBODIMENT

Figure 1:
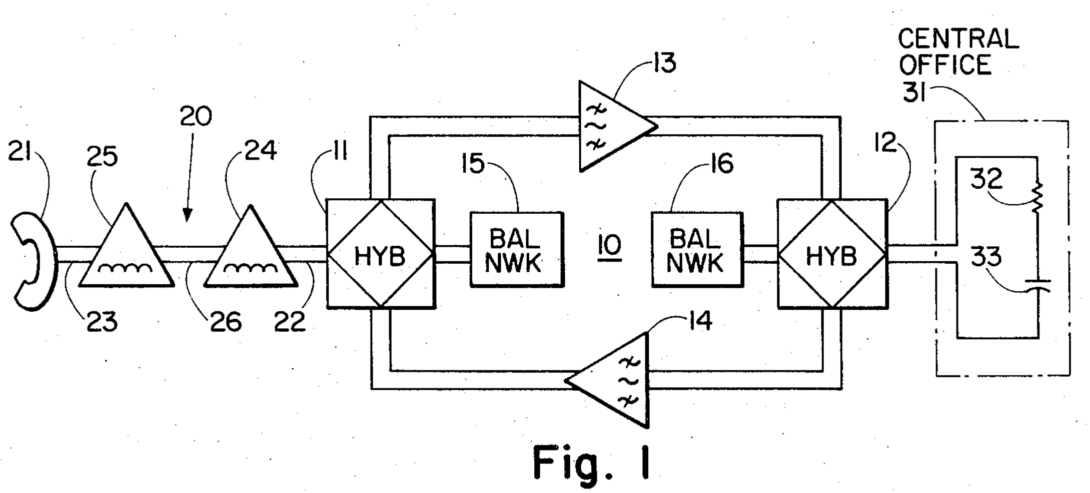
FIG. 1 is a block schematic diagram of a typical telephone transmission system utilizing a two-wire hybrid repeater connected to an inductively loaded telephone line.

Referring to FIG. 1, the telephone transmission system comprises a two-wire hybrid repeater generally 10 which includes two-wire to four-wire hybrid transformers 11 and 12, the four-wire outputs of which are coupled together through amplifiers 13 and 14 for amplifying the telephone signals in opposite directions. Each of the hybrid transformers 11 and 12 has connected to it a balance network 15 and 16 respectively to which the present invention is directed. The two-wire output of the hybrid transformer 11 is connected to an inductively loaded telephone line, generally 20, which in this example embodiment, terminates in a telephone set 21. The telephone line 20 includes a near end section 22, a far end section 23 separated by inductive loading coils 24 and 25. The loading coils 24 and 25 are separated by a standard section of telephone line 26. In a typical arrangement 88 mH loading coils are used for a 6,000 ft. section and 66 mH loading coils for 4,500 ft. section. Still other loading arrangements may be used as is well known in the art.

The two-wire output of the hybrid transformer 12 is shown as terminating in a central office 31 in a standard load consisting of a 900 ohm resistor 32 connected in series with a 2.16 μF capacitor 33. It will be understood that this is illustrative only and that in operating systems the resistor 32 and capacitor 33 would be approximated by the central office impedance.

In an operating telephone transmission system, the output signal from the telephone set 21, passes through the inductively loaded telephone line 20 to the two-wire input of the hybrid transformer 11 where it splits between the transmit and receive paths of the four-wire configuration. To maintain a balance across the hybrids 11 and 12, the input and output impedances of both amplifiers 13 and 14 are approximately the same, and are such as to reflect the standard 900 Ω load across the two-port inputs of the hybrids 11 and 12. The output signal on the transmit side of the hybrid transformer 11 passes through the amplifier 13 and thence through the hybrid transformer 12 where it again splits between the balance network 16 and the central office 31. The output signal entering the network 16 is absorbed. Similarly, signals emanating from the central office 31 pass through the hybrid transformer 12, the amplifier 14, the hybrid transformer 11, the telephone line 20 and are received by the telephone set 21.

Any impedance mismatch between the balance networks 15 and 16 and the telephone line 20 and central office 31 results in signal leakage across the hybrid transformers 11 and 12 respectively. The amount of attenuation across the four-wire ports of one of the hybrid transformers 11 or 12 is known as the trans-hybrid loss (THL); while the trans-hybrid loss of the hybrids 11 and 12 less the gain of the amplifiers 13 and 14 is known as the loop loss ($L_L$). In North American telephone systems, the mid-band or highest gain of each of the amplifiers 13 and 14 occurs between 500 and 2500 Hz and rolls off significantly below 200 Hz and above about 3000 Hz. Consequently, the loop loss increases at both low and high audio frequencies despite a degrading mismatch between the networks 15 and 16 and the telephone line 20 and central office 31.

When the two-wire port of the hybrid transformer 12 is open or short-circuited, such as may occur during dialing, the trans-hybrid loss for that transformer drops to 6 db. Under these conditions:

$$L_{L10} = THL_{11} + 6 - G_{13} - G_{14}$$

where:

$L_{L10}$ = loop loss of repeater 10 (db)
$THL_{11}$ = trans-hybrid loss of transformer 11 (db)
$G_{13}$ = gain of amplifier 13 (db)
$G_{14}$ = gain of amplifier 14 (db)

The terminal return loss (TRL) on the other hand, is equal to the trans-hybrid loss of one of the hybrids (e.g. hybrid 11 when terminated in the loaded line 20), plus the input and output coupling loss of the hybrid 12 (i.e. approximately 3 + 3 = 6db), less the gain of the two amplifiers 13 and 14. It will be observed that when the hybrid 12 is open or short-circuited.

$$L_L = TRL$$

The system objectives are TRL ≧ 18 db (500 to 2500 Hz), and $L_L$ ≧ 10 db (all frequencies when one hybrid is terminated in a loaded cable and the other is short/open-circuited). However, this has been found difficult to maintain in the past and it is often necessary to settle for a loop less than 10 db or in some instances to reduce the gain of the amplifiers 13 and 14 in order to avoid oscillation or "singing" around the loop of the hybrid repeater 10.

Figure 2:
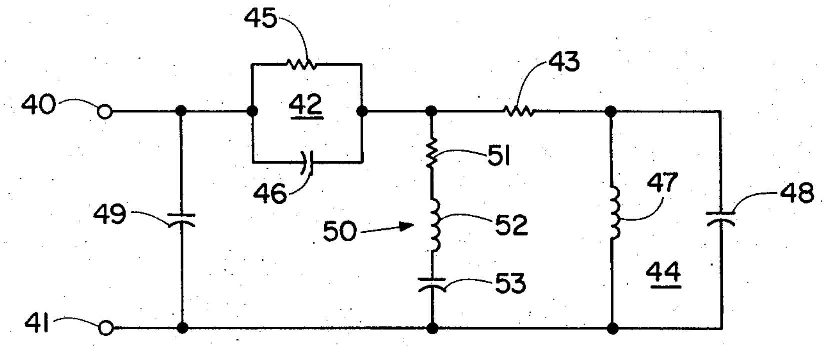
FIG. 2 is a schematic diagram of a balance network for use in the two-wire hybrid repeater illustrated in FIG. 1.

As mentioned above, the present invention is directed to the balance network 15 which is illustrated schematically in FIG. 2. The balance network 15 comprises input terminals 40 and 41 for connection to the hybrid transformers 11. Across the terminals 40 and 41, is connected the series combination of a low audio-frequency shaping network 42, a line approximating resistor 43 and a high audio-frequency shaping network 44. The low audio-frequency shaping network includes the shunt connected combination of a resistor 45 and a capacitor 46 while the high audio-frequency shaping network 44 includes the shunt resonant combination of an inductor 47 and capacitor 48. Also connected in shunt with the input terminals 40 and 41 of the balance network is a build-out capacitor 49. The improvement in this balance network is the addition of a resistively damped series resonant circuit 50, including a resistor 51, an inductor 52 and a capacitor 53, which coacts with the balance of the components in the network to provide a better match with an inductively loaded telephone line.

In the embodiment in FIG. 2, the resistively damped series resonant circuit 50 is connected in shunt with the line approximating resistor 43 and the high audio frequency shaping network 44. In alternate embodiments however, either one or both of the reactive components 52 or 53 may be placed in series with the line approximating resistor 43 while the balance of the components including the resistor 51 remain in shunt, as illustrated in FIG. 2. The components 51, 52 and 53 will still coact. However, of the three possible alternate combinations of inserting either the inductor 52, the capacitor 53 or the inductor 52 and capacitor 53 in series with the resistor 43, only the capacitor 53 in series with the resistor 43 appears practical since either of the other combinations results in unrealistic component values or degraded performance.

Figure 3:
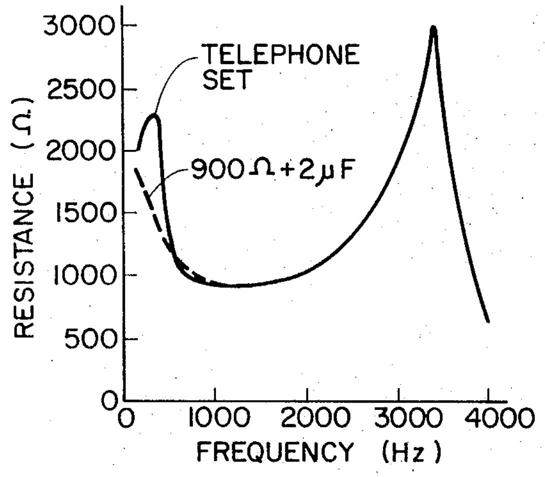
FIG. 3 illustrates the resistance at various frequencies of a typical inductively loaded telephone line encountered in a transmission system of the type illustrated in FIG. 1.

FIG. 3 illustrates the resistance as seen from the hybrid transformers of a typical inductively loaded telephone line at audio frequencies when terminated in both a telephone set and a standard 900 ohm + 216 μF load. For both terminations, the resistive component of the load remains relatively constant at about 1100 ohms at mid-band audio frequencies and increases below 400 Hz to approximately 2000 ohms.

Figure 4:
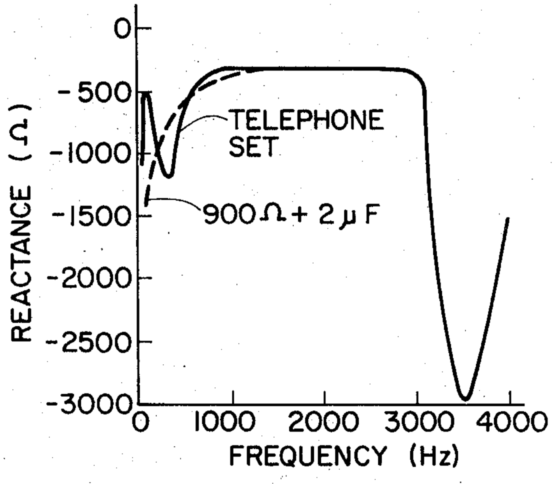
FIG. 4 illustrates the reactance at various frequencies of the inductively loaded telephone line described in reference to FIG. 3.

FIG. 4 illustrates the reactive component of a typical inductively loaded telephone line as seen from the hybrid transformer also when loaded in either a telephone set or the standard 900 ohm + 2.16 $\mu$F load. With the standard load, the reactive component increases negatively below 800 Hz. However, when the inductively loaded telephone line is terminated in a telephone set, the reactive component tends to deviate widely below about 500 Hz to either one side or the other relative to that of the standard load. The reactance eventually becomes capacitive at low audio frequencies. This is due to a blocking capacitor which forms an internal part of the hybrid transformer and is required to prevent d-c shorting of the cable pair by the hybrid transformer. This widely deviating reactive component has in the past resulted in a severe mismatch with the balance network particularly at audio frequencies below 1000 Hz.

It will be evident that with the widely varying parameters of the various telephone lines connected to the hybrids, it is not possible to have a single design with fixed component values which will provide a satisfactory impedance match for all installation. Consequently, it is customary to utilize a multiplicity of components in a single design and to vary the component values utilizing a series of jumpers to obtain the desired values. Selection of the component values is made on the following basis:

| Telephone Line Parameter | Component Selection |
|---|---|
| Loading Coil Inductance | Inductor 47<br>Capacitors 48 and 53 |
| Cable Gauge +<br>Loading Coil Inductance | Resistors 45 and 51<br>Inductor 52<br>Capacitor 46 |
| Near End Section Length +<br>Cable Gauge +<br>Loading Coil Inductance | Resistor 43<br>Capacitor 49 |

The original derivation of these component values can be achieved by selectively varying them to minimize the impedance matching error at a discrete number of frequencies across the audio spectrum, so as to optimize the impedance match between the networks and the telephone lines between about 200 and 4000 Hz. A non-limiting example, of typical values required for a balance network 15 to provide an improved match with an inductively loaded telephone line 20, is as follows:

| | | | |
|---|---|---|---|
| Telephone Line 20 | 24 A.W.G. | Capacitor 46 | 0.450 $\mu$F |
| Near End Section 22 | 3,000 ft. | Capacitor 48 | 0.0698 $\mu$F |
| Loading Coils 24, 25 | 88 mH | Capacitor 49 | 0.0281 $\mu$F |
| Resistor 43 | 1280 $\Omega$ | Capacitor 53 | 0.115 $\mu$F |
| Resistor 45 | 1230 $\Omega$ | Inductor 47 | 23.8 mH |
| Resistor 51 | 3890 $\Omega$ | Inductor 52 | 700 mH |

What is claimed is:

1. In a balance network for a telephone two-wire to four-wire hybrid transformer having its two-wire port connected to an inductively loaded telephone line, said network comprising:

a series connected combination of:

a first network including a resistor and capacitor connected in shunt for low audio frequency shaping, a resistor approximating in combination the resistance of the telephone line near end section, and a third network including an inductor and capacitor connected in shunt for high audio-frequency shaping; and a capacitor connected in shunt with said series connected combination to approximate in combination the capacitance of said telephone line;

the improvement comprising:

a series resonant inductor-capacitor-resistor connected in shunt with the series combination of said resistor and said shunt resonant inductor-capacitor, and coacting with the balance of the network components to provide an improved impedance match with the telephone line at low audio frequencies.

2. In a balance network, for a telephone two-wire to four-wire hybrid transformer, connected to a loaded telephone cable, comprising:

a series connected combination of a low audio frequency shaping network including a resistor and capacitor connected in shunt, a line approximating resistance network including a resistor, and a resonant high audio frequency shaping network including an inductor and capacitor connected in shunt; and a build-out capacitor in shunt with said series connected combination;

the improvement comprising:

a series resonant inductive-capacitive-resistive low audio frequency compensating network connected in shunt with the series combination of said line approximating resistance and said high audio frequency shaping network, and in which at least the resistive component of the compensating network is connected in shunt with the series combination of the low audio frequency shaping network and the build-out capacitor.

3. In a balance network, for a telephone two-wire to four-wire hybrid transformer having its two-wire port connected to an inductively loaded telephone line, and its four-wire ports connected to substantially resistive loads, said network comprising:

a series connected combination of a first network including a first resistor and a first capacitor connected in shunt to provide an increased impedance at low audio frequencies, a second network including a second resistor which together with the balance of the resistance approximates the resistance of said telephone line, and a third network including a first inductor and a second capacitor connected in shunt to resonate at high audio frequencies to provide increased impedance at high audio frequencies; and a third capacitor connected in shunt with said series connected combination which together with the balance of the impedances approximates the capacitance of said telephone line;

the improvement comprising:

a second inductor, a fourth capacitor and a third resistor connected in series resonance across the series combination of said second resistor, said first inductor and second capacitor, and being resonant at low audio frequencies to provide an improved impedance match with the telephone line below its series resonance.

4. A balance network as defined in claim 3 in which the values of the series combination of the second inductor, fourth capacitor and third resistor are selected so as to provide increased damping of the first inductor and the second capacitor at the shunt resonant frequency thereof.

* * * * *